US008052107B2

(12) United States Patent
Yang et al.

(10) Patent No.: US 8,052,107 B2
(45) Date of Patent: Nov. 8, 2011

(54) SATELLITE RECEIVER

(75) Inventors: Lan-Chun Yang, Hsichih (TW); Hung-Yuan Lin, Hsichih (TW)

(73) Assignee: Wistron Neweb Corp., Hsichih Taipei (TW)

( * ) Notice: Subject to any disclaimer, the term of this patent is extended or adjusted under 35 U.S.C. 154(b) by 634 days.

(21) Appl. No.: 12/216,211

(22) Filed: Jul. 1, 2008

(65) Prior Publication Data

US 2009/0061761 A1 Mar. 5, 2009

(30) Foreign Application Priority Data

Sep. 5, 2007 (TW) .............................. 96133102 A

(51) Int. Cl.
*F16M 11/00* (2006.01)

(52) U.S. Cl. ......... 248/201; 248/121; 343/882; 343/878

(58) Field of Classification Search .................. 248/201, 248/121, 278.1, 514; 343/882, 880, 890, 343/891

See application file for complete search history.

(56) References Cited

U.S. PATENT DOCUMENTS 4,875,052 A * 10/1989 Anderson et al. ............. 343/882
6,023,247 A * 2/2000 Rodeffer ....................... 343/765
6,963,316 B1 * 11/2005 Lin ............................... 343/882
7,113,144 B2 * 9/2006 Lin et al. ........................ 343/880
7,164,391 B2 * 1/2007 Lin et al. ........................ 343/882
7,265,732 B2 * 9/2007 Lin ............................... 343/882
7,369,097 B1 * 5/2008 Sherwood ..................... 343/880
7,443,355 B2 * 10/2008 Griffiths ........................ 343/786
2006/0231693 A1 * 10/2006 Lin et al. ........................ 248/121
2008/0165076 A1 * 7/2008 Pan ............................... 343/882
2011/0031360 A1 * 2/2011 Pan ............................... 248/201

OTHER PUBLICATIONS

Taiwanese Office Action dated Apr. 11, 2011 with a partial English translation. pp. 1-5.

* cited by examiner

*Primary Examiner* — Amy J Sterling
(74) *Attorney, Agent, or Firm* — Birch, Stewart, Kolasch & Birch, LLP

(57) ABSTRACT

The present invention provides a satellite receiver comprising a base, a rotation stand, an adjusting mechanism, and a positioning device. The base has an axis aperture and a first slot. The rotation stand is rotatably attached to the base through the axis aperture. The adjusting mechanism has a connection end and an adjusting end. The connection end is coupled with the rotation stand and is movable together with the upper stand to generate displacement relative to the base. The positioning device is coupled with the adjusting end and passes through the first slot. When the upper stand rotates relatively to the base, the adjusting mechanism drives the positioning device to move along the first slot. The first slot limits the angular rotation of the rotation stand and the positioning device and selectively constrains the relative displacement between the connecting unit and the base.

24 Claims, 10 Drawing Sheets

SATELLITE RECEIVER

BACKGROUND OF THE INVENTION

1. Field of the Invention

The present invention relates to a wireless signal receiver; particularly, the present invention relates to a satellite receiver.

2. Description of the Prior Art

As technology advances, the technology level of wireless signal transmission and the depth of its application also reach a new level. As for the field of communication, the applications of wireless communication include personal mobile communication, broadcast, wireless network, satellite communication etc. In order to further enhance the technology development and the depth of application; the fidelity of transmitted and received wireless signal needs to be continuously improved. For instance, the reception side often needs to utilize satellite antenna as the reception device for satellite signal, and therefore the precise contraposition of antennae for improving the directivity of antenna signal has become a key factor in ensuring the quality of received signal.

FIG. 1 illustrates the perspective view of a conventional satellite antenna. As FIG. 1 shows, the conventional satellite antenna includes a satellite dish antenna 10, an elevation angle adjustor 30, an azimuth rotation stand 50 and a base 70. The dish antenna 10 is disposed above the elevation angle adjustor 30, and the elevation angle adjustor 30 couples with the azimuth rotation stand 50 and is capable of rotating in a vertical angle. The azimuth rotation stand 50 is disposed on the base 70 and is capable of rotating horizontally. The objective of the conventional satellite antenna is to adjust the orientation of elevation angle adjustor 30 and azimuth rotation stand 50, in order to locate the most effective angle for signal reception.

As the demand for improved sensitivity of directivity in satellite signal increases, the dish antenna 10 often needs to adapt fine-tune to reach the required angle. As FIG. 1 shows, the shown elevation angle adjustor 30, azimuth rotation stand 50 and the base 70 are often locked with bolts and screws which creates difficulty in the fine-tuning of angles and also degrades the overall precision of angle adjustment. Furthermore, antenna installation often requires the test for signal reception; in order to locate the range of angles which will not be interfered by other external signal sources. The conventional method of bolt/screw locking cannot offer rapid test required and also cannot offer quick recovery to the default angle setting.

SUMMARY OF THE INVENTION

It is an objective of the present invention to provide a satellite receiver to rapidly execute the adjustment in the reception angle for signal.

It is another objective of the present invention to provide a satellite receiver to reduce the installation time of antenna.

It is one of the objectives of the present invention to provide a satellite receiver which facilitates the test and search for the angles of signal sources.

It is one of the objectives of the present invention to provide a satellite receiver able to rapidly return the satellite receiver to the default zero position.

The satellite receiver includes a base, a rotation stand, an adjusting mechanism and a positioning device. The base couples with structures below and support the wireless signal receiver above. An axis aperture and a first slot are defined on the base. The rotation stand includes a shaft rotatably attached to the base through the axis aperture. The rotation stand couples with the wireless signal receiver, and therefore the wireless signal receiver is able to utilize the coupling relationship between rotation stand and base to generate rotation and to execute the angle adjustment.

The adjusting mechanism includes a rod having a connection end and an adjusting end, wherein the connection end of the rod couples with the rotation stand through the base. The connection end also moves together with the rotation stand to generate displacement relative to the base. The positioning device couples with the adjusting end of the adjusting mechanism while passing through the first slot on the base. When the rotation stand rotates relative to the base relative the axis aperture, the positioning device moves together with the adjusting mechanism, to generate displacement along the axis of the first slot. The positioning device has a pin, wherein a first end of the pin couples with the adjusting end of the adjusting mechanism, and a second end of the pin passes through the first slot. Furthermore, the positioning device can selectively limit the displacement generated by the adjusting device relative to the base. The user thus can operate and control the positioning device to fix the relative position between the adjusting mechanism and the base, or to release the positioning device in order for the adjusting mechanism to generate displacement relative to the base.

DETAILED DESCRIPTION OF THE PREFERRED EMBODIMENT

The present invention provides a wireless signal receiver. In one embodiment, the wireless signal receiver includes a satellite receiver such as a satellite antenna. However, in other embodiments, the wireless signal receiver can also include other types of antennas or signal receivers, such as a communication network antenna, a television signal antenna, a broadcast signal antenna etc. Furthermore, the satellite antenna is preferred to include a dish antenna. However, in other embodiments, the satellite antenna may also include other types or forms of antennas.

Figure 1:
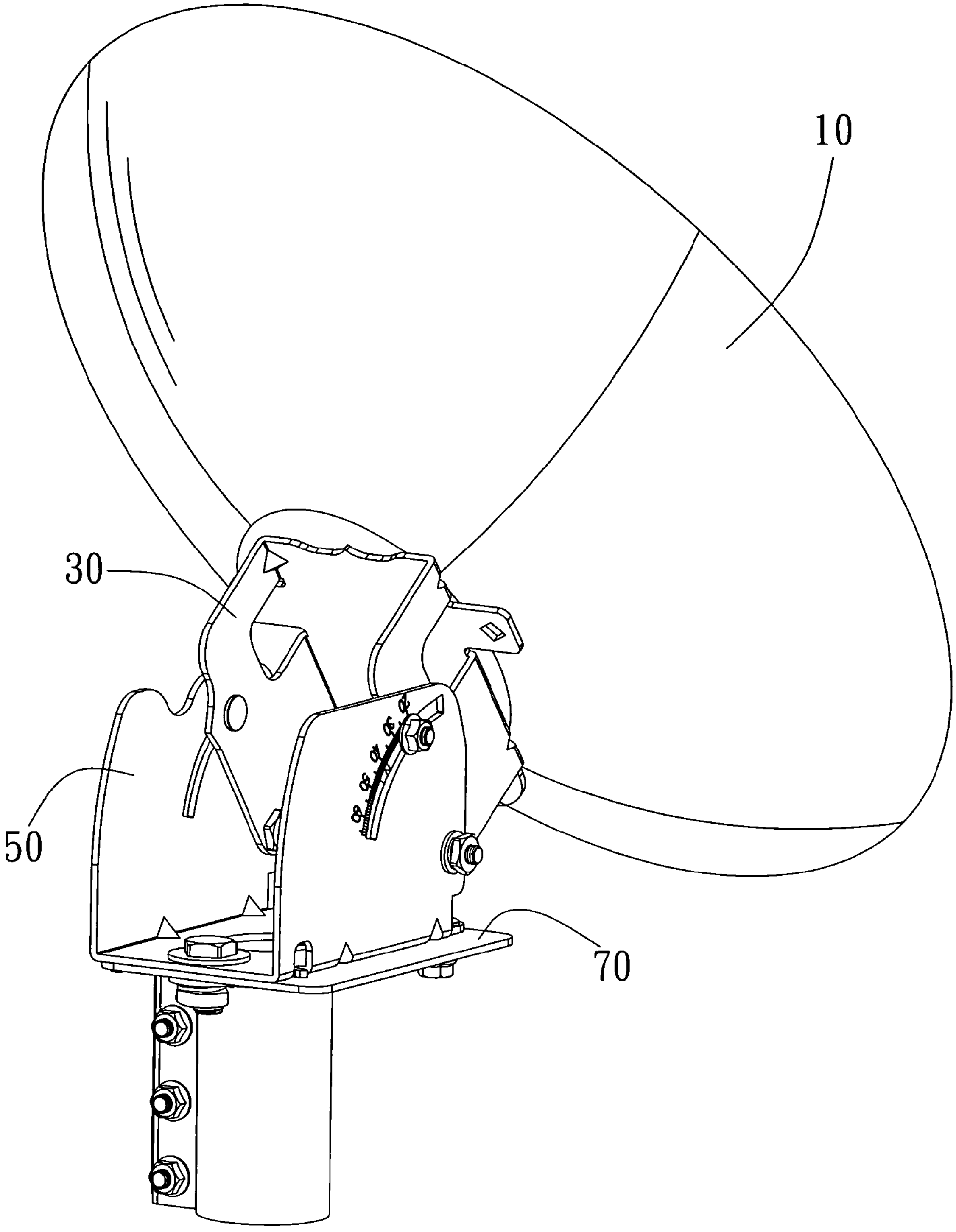
Fig. 1 (PRIOR ART)
FIG. 1 is a perspective view of a conventional antenna.
Figure 2:
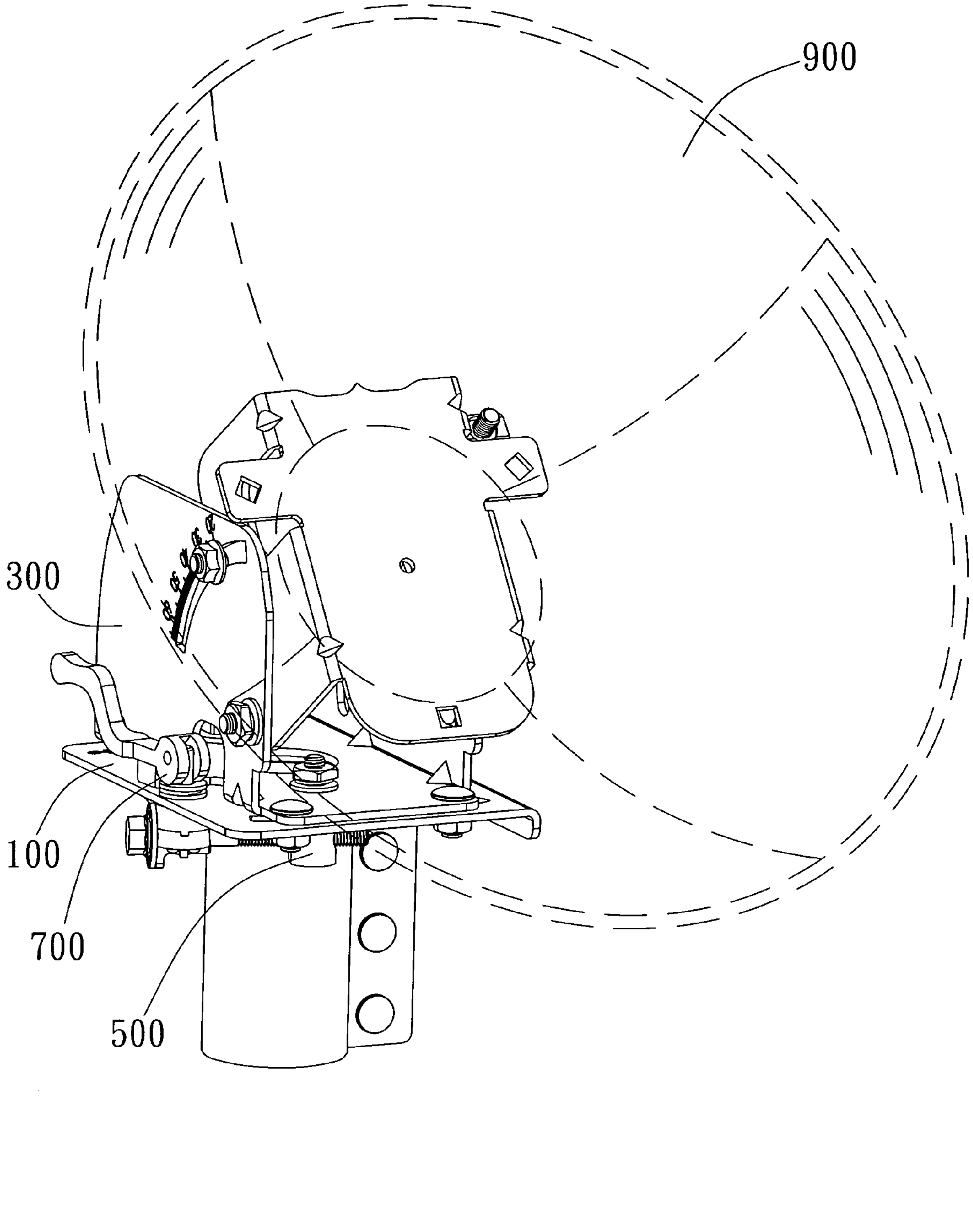
FIG. 2 illustrates a perspective view of the embodiment showing the wireless signal receiver supporting structure of the present invention.

As FIG. 2 shows, the satellite receiver of the present invention comprises a base 100, a rotation stand 300, an adjusting mechanism 500 and a positioning device 700. The base 100 couples with the structure below and supports the antenna dish 900 above. In an embodiment shown in FIG. 3, an axis aperture 130 and a first slot 210 are defined on the base 100. In the present embodiment, the first slot 210 is an curved guiding slot, and is distributed around the axis aperture 130. In other words, the axis aperture 130 can be regarded as the curved center of the first slot 210. Furthermore, a central angle of the axis aperture 130 relative to the length of the first slot 210 is preferred to be less than five degree. However, in other embodiments, this central angle can be further limited to be less than three degree.

Figure 3:
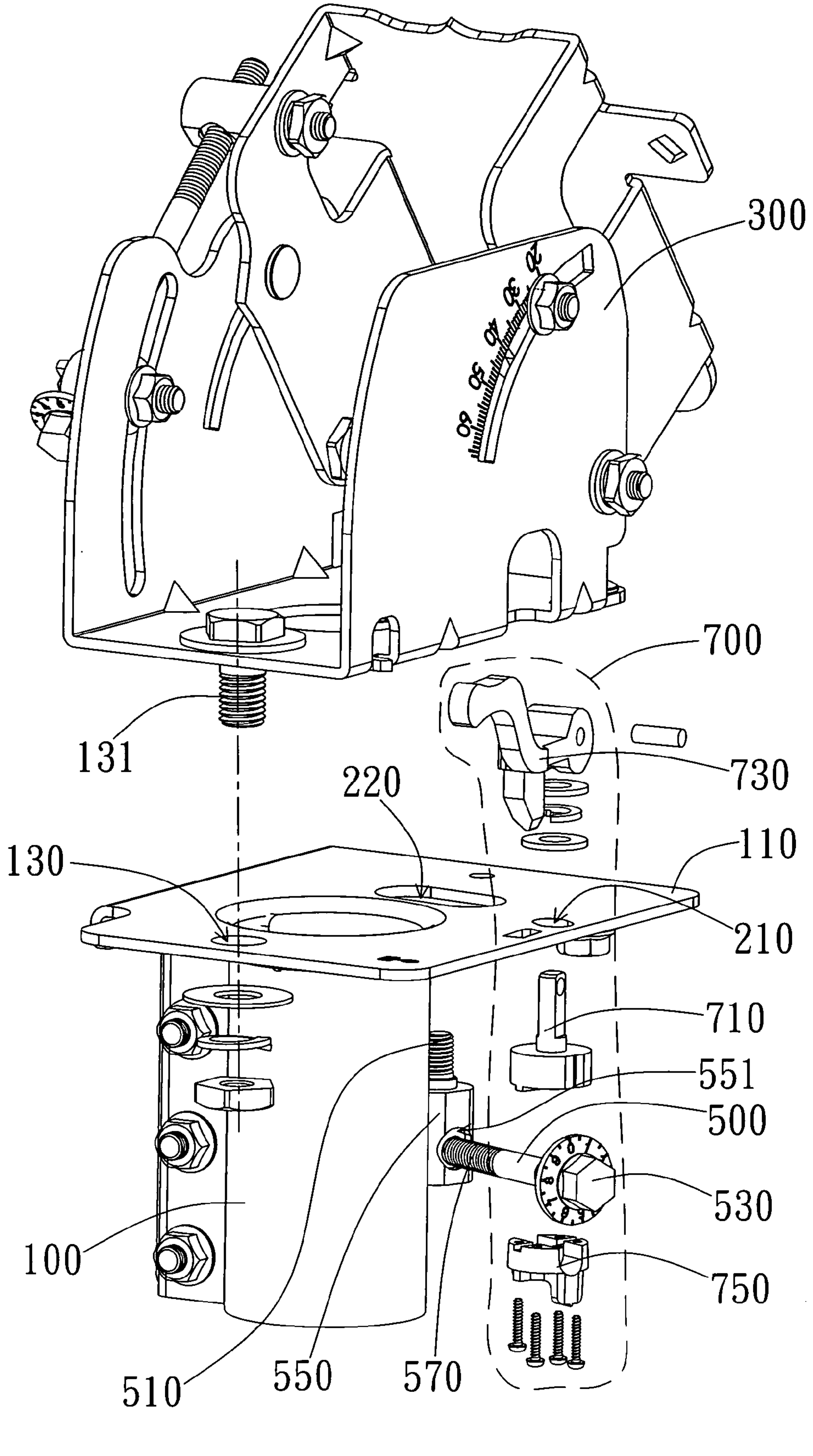
FIG. 3 illustrates an exploded view of an embodiment of the wireless signal receiver supporting structure of the present invention.

In FIG. 3, a shaft 131 is disposed on the rotation stand 300. The shaft 131 passes through the axis aperture 130 which allows the rotation stand 300 to be rotatably attached to the base 100. However, in other embodiments, the shaft 131 may be disposed on the base 100. In the embodiment shown in FIG. 3, because the surface where the axis aperture 130 is disposed in parallel with the water level, and also the shaft 131 is perpendicular to the ground surface, therefore the rotation stand 300 is able to rotate horizontally on the base 100. However, in other embodiments, where the shaft 131 tilts relatively to the water level, the rotation stand 300 is able to rotate on a tilted slope relative to the base 100. In different embodiments, when the shaft 131 is parallel to the water level, the above-mentioned slope can further include an upright surface perpendicular to the water level. The rotation stand 300 couples with the wireless signal receiver 900, and therefore the wireless signal receiver 900 is capable of utilizing the coupling between the rotation stand 300 and base 100 to generate rotation relative to the base 100, in order to execute the horizontal angle adjustments. However, in different embodiments, the rotation stand 300 is preferred to be utilized for the adjustment in azimuth angle relative to the base 100. However, in other embodiments, the rotation stand 300 is preferred to be used in the adjustment of elevation angle relative to the base 100. Furthermore, the coupling surface between the rotation stand 300 and the base 100 is preferred to expose the first slot 210. The first slot 210 can also be defined on the lateral side of the rotation stand 300 or on the opposite side relative to the axis aperture 130.

As FIG. 3 shows, the adjusting mechanism 500 includes a rod 570 having a connection end 510 and an adjusting end 530, wherein the connection end 510 couples with the rotation stand 300 and moves together with the rotation stand 300 to generate displacement relative to the base 100. In the present embodiment, the adjusting mechanism 500 further includes a connecting stand 550 which couples with the rotation stand 300 and they are preferred to be coupled through bolting, which allows the connecting stand 550 to pass through the openings on the base 100, and use the bolt of the connection stand 550 to couple with the bolt aperture available on the rotation stand 300. However, in other embodiments, the connecting stand 550 can also couple with the rotation stand 300 through welding or other methods. Furthermore, the connecting stand 550 can be constructed by bending part of metal element of the rotation stand 300; and then the rotation stand 300 is able to pass through the openings on the base 100 to couple with the rod 570.

As FIG. 3 shows, in the present embodiment, a guiding aperture 551 is defined on one lateral side of the connection stand 550. The connection end of the rod 570 passes through the guiding aperture 551 and couples with the connection stand 550. Furthermore, the rod 570 and the guiding aperture 551 are preferred to respectively have the corresponding thread, and in this way the rod 570 can couples with the guiding aperture 551 via bolt connection. The distance between the adjusting end 530 and the connection stand 550 can then be adjusted by rotating the rod 570.

In the embodiment shown in FIG. 3, a second slot 220 is defined on the base 100. The second slot 220 surrounds the axis aperture 130 of the base 100; and thus the axis aperture 130 can be regarded as the curved center of the second slot 220. The connection stand 550 passes through the second slot 220 and couples with the rotation stand 300, and thus the rotation stand 300 and the rod 570 are disposed on different sides of the base 100. As the rotation stand 300 rotates relatively to the base 100, the connection stand 550 moves together with the rotation stand 300, and generates displacement along the axis aperture 130 surrounded by the second slot 220. In the present embodiment, the coupled adjusting mechanism 500 and the rotation stand 300 can be regarded as being disposed on different sides of the base. However, in other embodiments, the adjusting mechanism 500 and the rotation stand 300 may be disposed on the same side of the base 100; and thus the adjusting mechanism 500 will not pass through the second slot 220 of the base 100.

As shown in FIG. 2 and FIG. 3, the positioning device 700 couples with the adjusting end 530 of the adjusting mechanism 500, and passes through the first slot 210 of the base 100. When the rotation stand 300 utilizes the axis aperture 130 and the shaft 131 to rotate relatively to the base 100; the positioning device 700 moves together with the adjusting mechanism 500 and generates displacement along the first slot 210 and around the axis aperture 130 as well as the shaft 131. The positioning device 700 passes through the first slot 210, and therefore the first slot 210 is able to limit the amount of displacement generated by the positioning device 700, and to also limit the rotation angle of the rotation stand 300 relative to the base 100. Furthermore, the positioning device 700 can also selectively restrict the displacement of the adjusting mechanism 500 relative to the base 100. In other words, the positioning device 700 can be used to fix the relative position of the adjusting mechanism 500 and the base 100. The positioning device 700 can also be released, allowing the adjusting mechanism 500 to generate displacement relative to the base 100.

Figure 4:
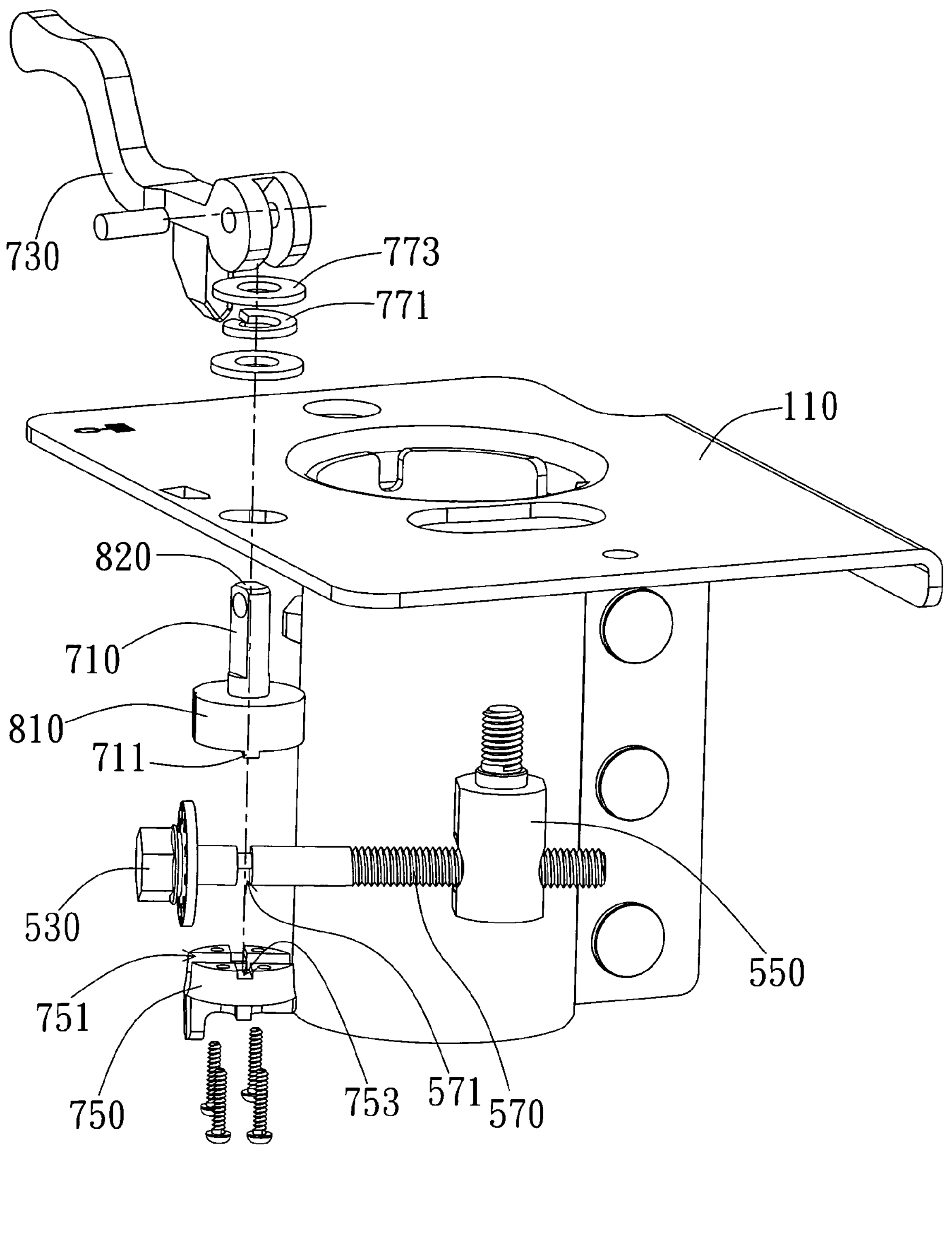
FIG. 4 illustrates a perspective view showing an embodiment of the adjusting mechanism and the positioning device of the present invention.

In the embodiment shown in FIG. 2 and FIG. 3, the positioning device 700 selectively clamps the base 100 on the side of the surface where the first slot 210 is disposed, in order to fix the relative position between the adjusting mechanism 500 and the base 100. As FIG. 4 shows, the positioning device 700 includes a pin 710 and an arm 730. A first end 810 of the pin 710 couples with the adjusting end 530 of the adjusting mechanism 500. A second end 820 of the pin 710 passes through the first slot 210. The arm 730 and the pin couple with the second end 820 which passes through the first slot 210. The tail of the arm 730 is to be pulled by the user, allowing the arm 730 to rotate relatively to the top end of the pin 710 in order to release or to fix the positioning device 700.

In an embodiment shown in FIG. 4, the positioning device 700 further includes a cover 750. The cover 750 may couple with the first end 810 of the pin 710 to clamp the adjusting end 530 of the adjusting mechanism 500 which is disposed on the rod 570. As FIG. 4 shows, a tenon 711 is disposed on the first end 810 of the pin 710 on the side facing the rod 570. The tenon 711 is preferred to be perpendicular to the axial orientation of the rod 570. A rod groove 751 and a mortise 753 are formed on the cover 750. The rod groove 751 is parallel to the rod 570, and the rod 570 is to be rotatably accommodated by the rod groove 751. The mortise 753 corresponds to the tenon 711 on the first end 810 of the pin 710 and is preferred to be perpendicular to the rod groove 751. A circular groove 571 is formed on the rod 570.

Figure 5:
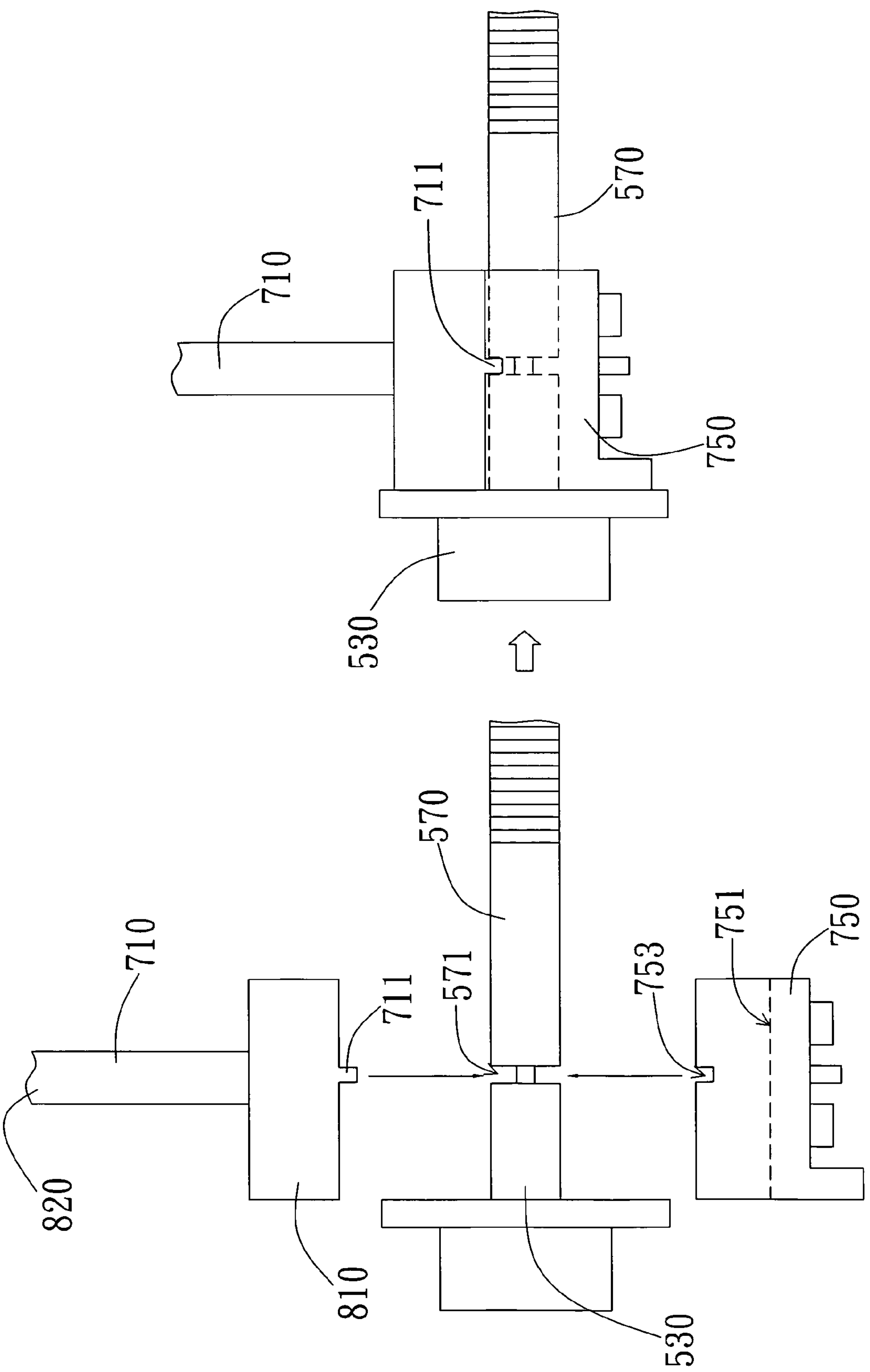
FIG. 5 illustrates a side view showing the embodiment of the adjusting mechanism and the positioning device of the present invention.

As FIG. 5 shows, when the rod 570 is accommodated in the rod groove 751 and when the cover 750 couples with the pin 710. The tenon 711 simultaneously enters the circular groove 571 and fits into the mortise 753. In this way, as the rod 570 regulates the relative position between the rotation stand 300 and the base 100 by rotating the rod 570, the tenon 711 will be able to restrict the displacement of the rod 570 relative to the pin 710. In the present embodiment, the cover 750 and pin 710 are preferred to be fastened by bolts. However, in other embodiments, the cover 750 and the pin 710 can be coupled together through welding and fastening mechanism. If the rotation of the rod 570 is not required, the positioning device 700 can also use the pin 710 and the cover 750 without the tenon 711 and mortise 753. Furthermore, the positioning device 700 can also exclude the cover 750, and couple the first end 810 of the pin 710 with the rod 570 through welding or other methods.

Figure 6A:
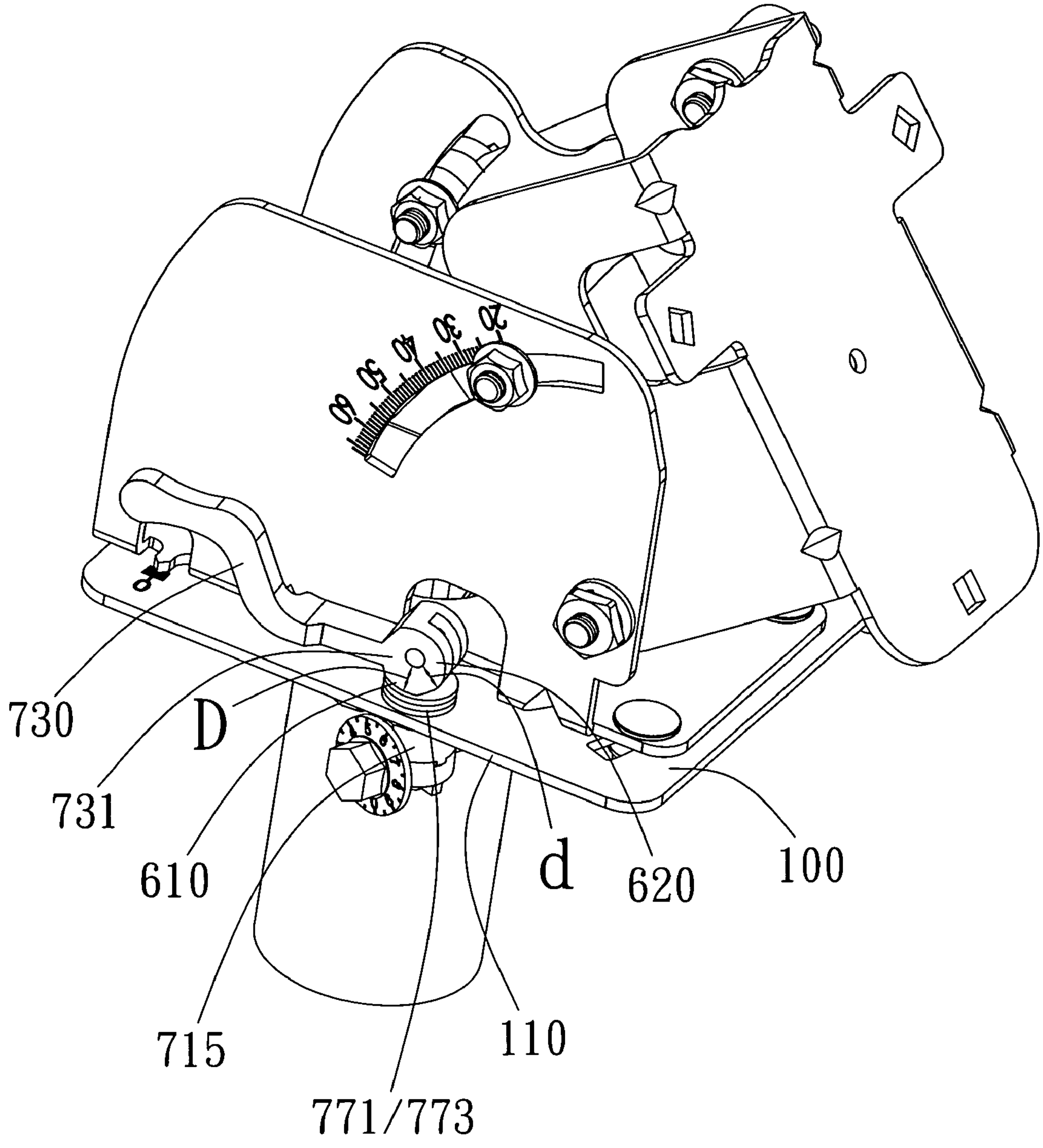
FIG. 6*a* illustrates a perspective view illustrating an embodiment when the arm of the present invention is pressed down.
Figure 6B:
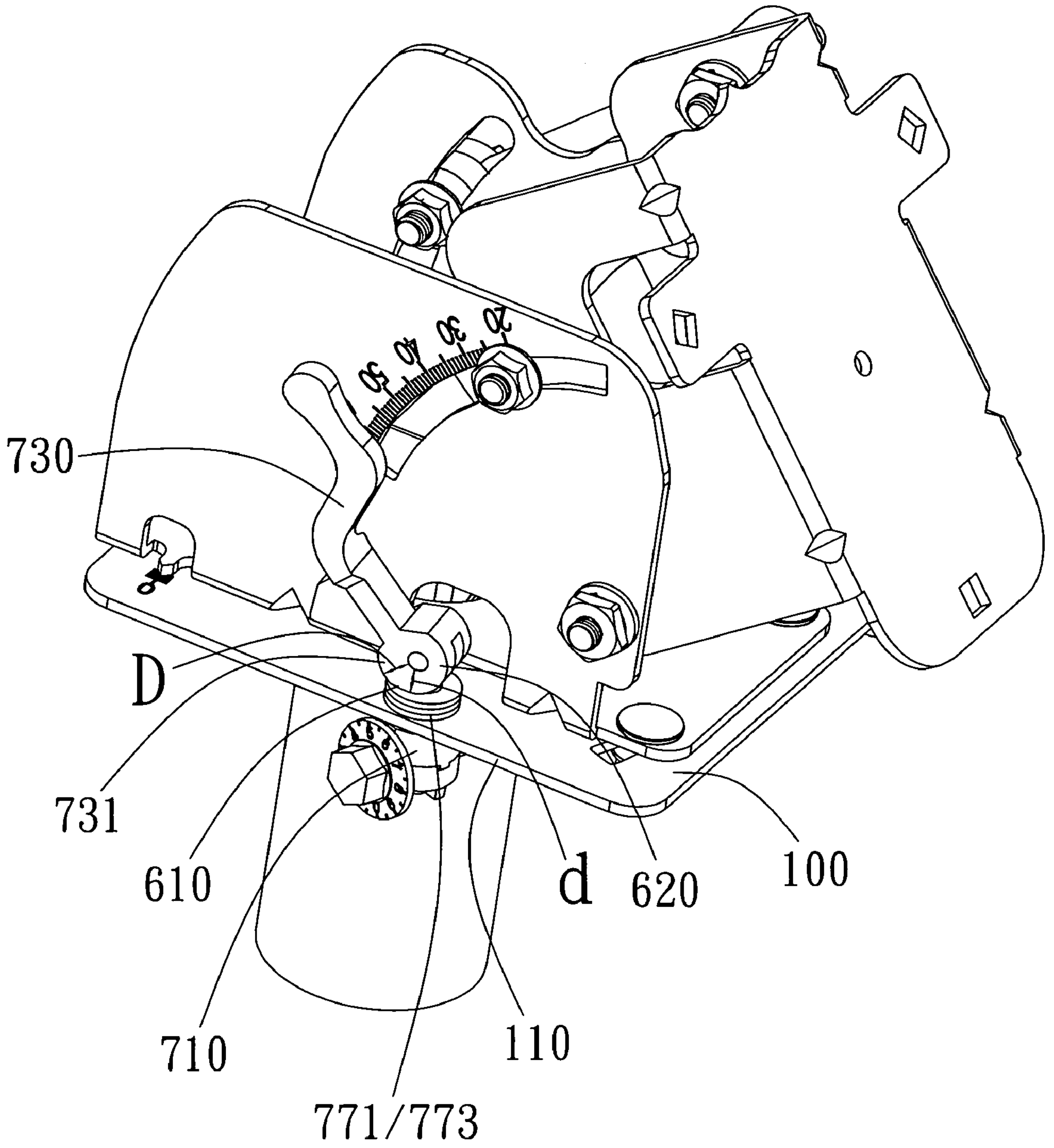
FIG. 6*b* illustrates a perspective view illustrating an embodiment the arm of the present invention is raised.

As FIG. 6*a* and FIG. 6*b* show, the arm 730 is coupled together with the second end 820 of the pin 710 forms a cam 731. The cam 731 includes a first radius part 610 and a second radius part 620. In the present embodiment, the radius D of the first radius part 610 is greater than the radius d of the second radius part 620. The user can rotate the first radius part 610 or the second radius part 620 to face the base 100 alternatively, by pulling the arm 730 back and forth. As FIG. 6*a* shows, when the first radius part 610 faces the base 100, the cam 731 will press the part of the base 100 close to the first slot 210 to fix the relative position between the adjusting mechanism 500, the rotation stand 300 and the base 100. As FIG. 6*b* shows, when the second radius part 620 faces the base 100, the stress on the base 100 from the cam 731 decreases or disappears; the positioning device 700 then releases the restriction on the adjusting mechanism 500 and the base 100. This allows the adjusting mechanism 500 and the rotation stand 300 to generate displacement relative to the base 100, and to also adjust the angle that rotation stand 300 can move under the angular displacement limit of the first slot 210.

As shown in FIG. 6*a* and FIG. 6*b*, the first end 810 of the pin 710 may expand to form a flange. The flange can be used as a clamp unit 715 which corresponds to the cam 731. As FIG. 6*a* shows, when the arm 730 is pressed downwards, allowing the first radius part 610 to face the base and to put pressure on the base 100, the cam 731 and the clamp unit 715 respectively clamps the top and the bottom surface of the stage surface 110 of the base 100. As FIG. 6*b* shows, when the arms 730 is raised which allows the second radius part 620 to face the base 100, the pressure on stage surface 110 of the base 100 is then released from the cam 731 and from the clamp unit 715. However, in other embodiments, the clamp unit 715 can be omitted and thus only the friction between the cam 731 and the base 100 is utilized to position the rotation stand 300 and the adjusting mechanism 500. Furthermore, as shown in FIG. 6*a* and FIG. 6*b*, the positioning device 700 may further include one or a plurality of spring washers 771 or pads 773 disposed between the cam 731 and the base 100, and are looped around the second end 820 of the pin 710, in order to regulate the tension and stability of the positioning device 700. However, in other embodiments, the spring washers 771 and the pad 773 may be disposed between the clamp unit 715 and the base 100.

Figure 7A:
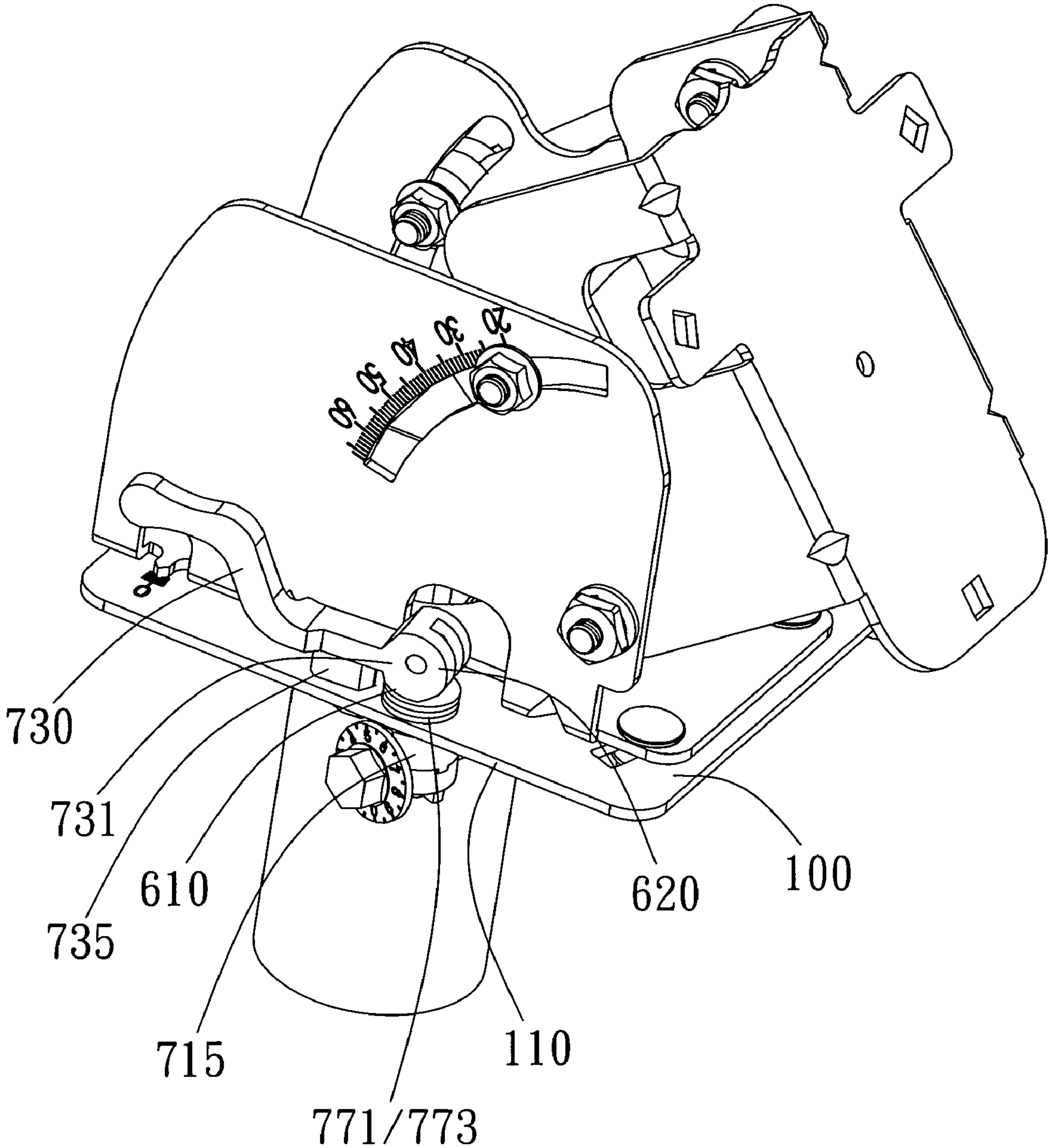
FIG. 7*a* illustrates a perspective view showing the embodiment when the positioning block of the present invention enters the positioning groove.
Figure 7B:
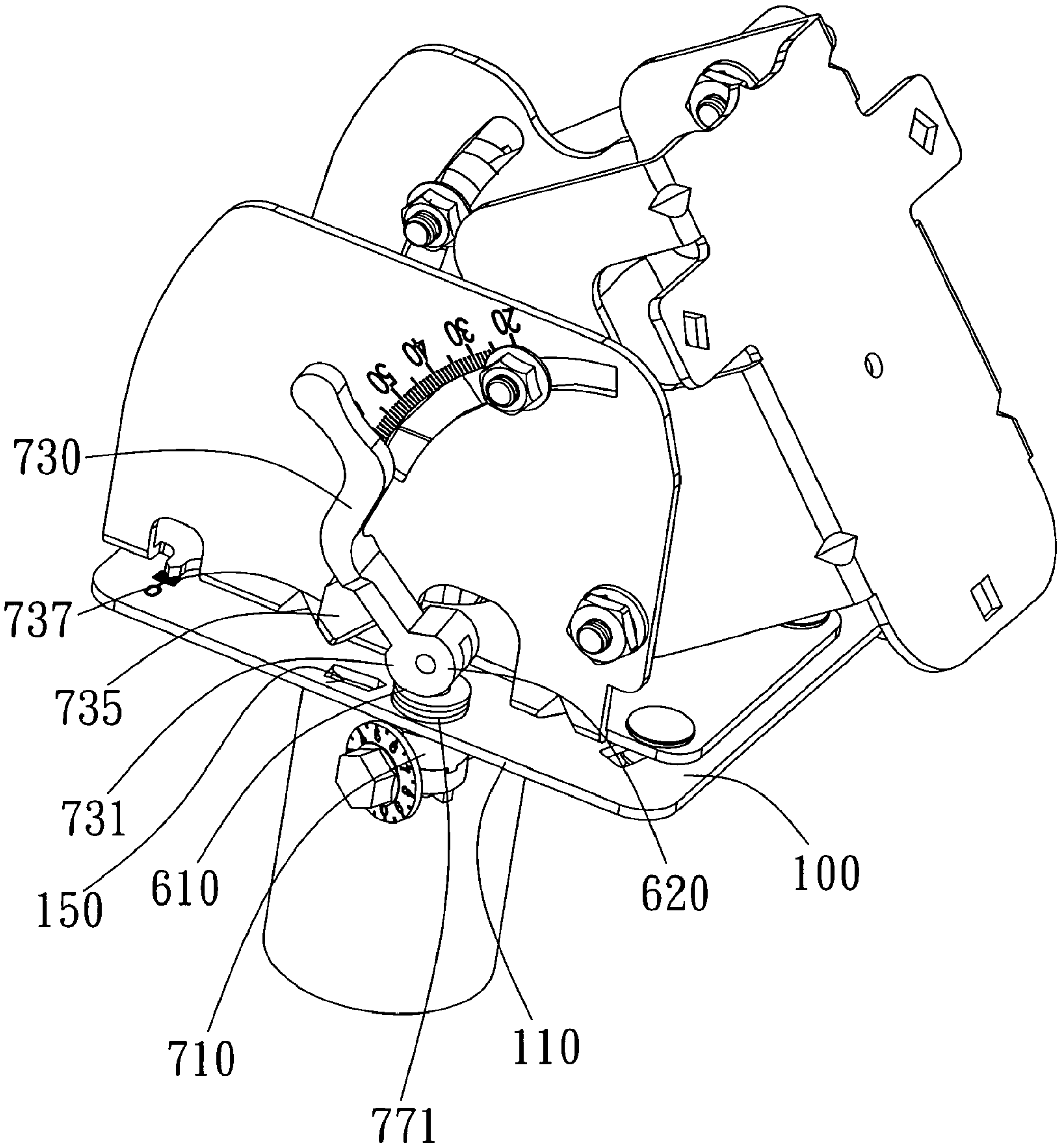
FIG. 7*b* illustrates a perspective view showing the embodiment when the positioning block separates from the positioning groove.

In an embodiment shown in FIG. 7*a* and FIG. 7*b*, a positioning groove 150 is disposed on the base 100. The positioning groove 150 is disposed next to the first slot 210, and is exposed outside the coverage of the rotation stand 300. As FIG. 7*a* shows, the tail end of the arm 730 extends towards the positioning groove 150, and a positioning block 735 is disposed on the arm 730 which corresponds to the location of the positioning groove 150. In the present embodiment, when the arm 730 is pressed downwards in order to fix the position of the adjusting mechanism 500 and the rotation stand 300, the arm 730 pivots on the second end of the pin to engage the positioning block 735 with the positioning groove 150 when in a positioning state. At this time, the positioning block 735 engages with the positioning groove 150 and limits the displacement of the positioning device 700 relative to the base 100, and also limits the displacement of the adjusting mechanism 500 and the rotation stand 300. As FIG. 7*b* shows, when the arm 730 is raised, the positioning block 735 separates from the positioning groove 150, and releases limitation on the adjusting mechanism 500 and the rotation stand 300.

Apart from the displacement limiting function, the step of engaging the positioning block 735 with the positioning groove 150, also has the function of aligning the positioning block 735 with the positioning groove 150. If the position of the surface where the rotation stand 300 and the base 100 join is set as the zero position, then the action of pressing down the arm 730 and moving the positioning block 735 into the positioning groove 150 has the effect of returning the system to the zero position. As FIG. 7*b* shows, in order to facilitate the coupling of the positioning block 735 with the positioning groove 150, the end of the positioning block 735 can be processed to have one or a plurality of guiding slanting surface 737. Furthermore, in the more preferred embodiment, shown in FIG. 7*a* and FIG. 7*b*, the positioning block 735 and the cam 731 may both be disposed on the arm 730. However, in other embodiments, the arm 730 may have only the positioning block 735 or the cam 731.

Figure 8:
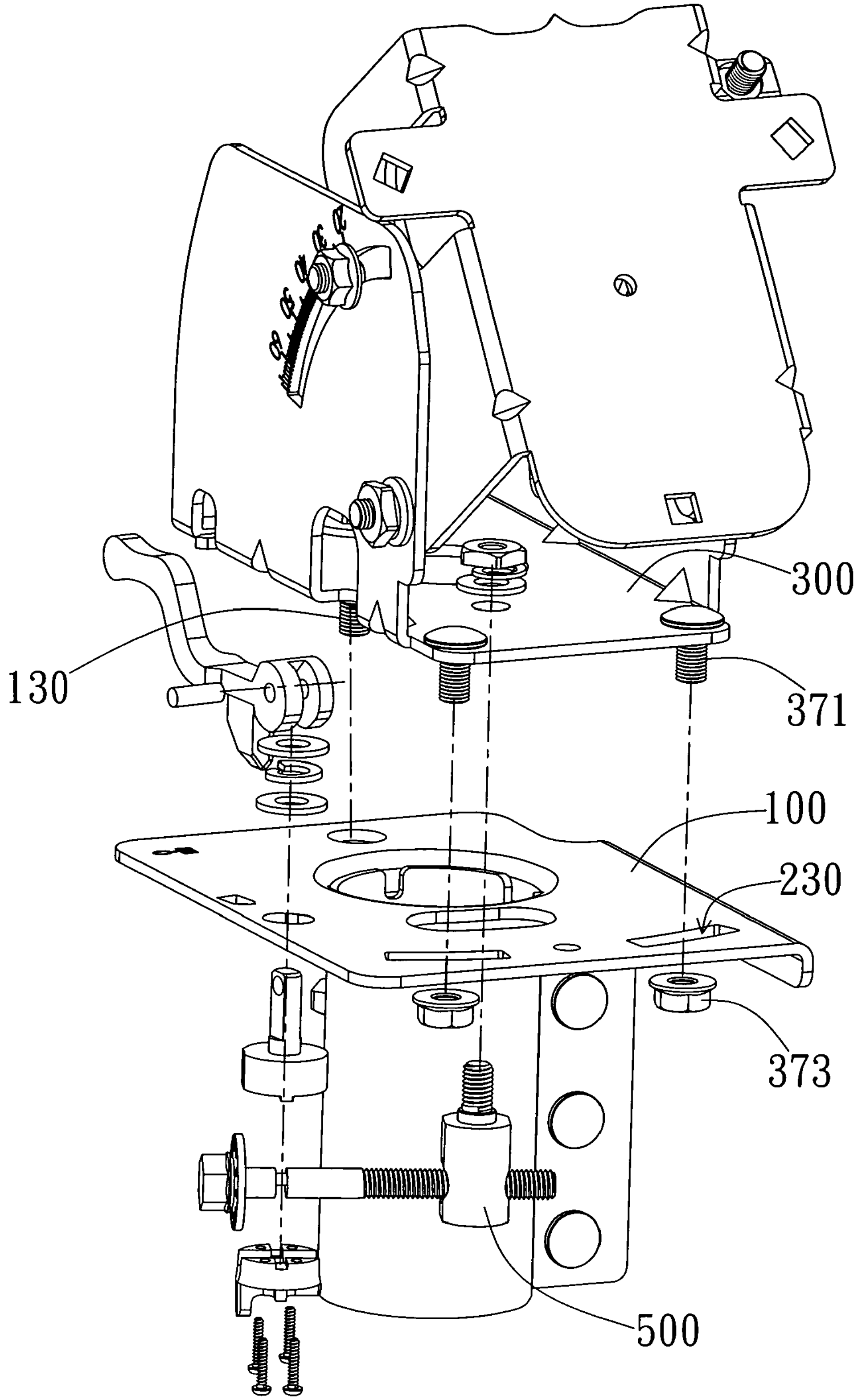
FIG. 8 illustrates a perspective view showing another embodiment of the wireless signal receiver supporting structure of the present invention.

In the embodiment shown in FIG. 8, a third slot 230 which surrounds axis aperture 130 is disposed on the base 100. The rotation stand 300 includes a guiding rod 371 and a locking device 373. The guiding rod 371 passes through the third slot 230 uses the locking device 373 to fix the guiding rod 371 from the side of the base 100 opposite to the coupling surface between the base 100 and the rotation stand 300. The rotation stand 300 and the locking device 373 are therefore able to clamp the base 100, to limit the displacement of the guiding rod 371 in the third slot 230. As the locking device 373 releases or partially releases its clamping on the base 100, the rotation stand 300 can then rotate with respect to the base 100, and also utilize the third slot 230 to guide the guiding rod 371 and to improve stability. In the more preferred embodiment, the locking device 373 includes a bolt which locks the rotation stand 300 together using the thread on the guiding rod 371. However, in other embodiments, the locking device 373 can also be a clamping apparatus or other designs with similar function.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A satellite receiver comprising:

a base defined an axis aperture and a first slot;

a rotation stand including a shaft, the shaft rotatably attached to the base through the axis aperture;

an adjusting mechanism including a rod having a connection end and an adjusting end, wherein the connection end of the rod couples with the rotation stand through the base; and a positioning device having a pin, wherein a first end of the pin couples with the adjusting end of the adjusting mechanism, and a second end of the pin passes through the first slot; and the positioning device selectively limits the movement of the adjusting mechanism relative to the base.

2. The satellite receiver of claim 1, wherein the base is defined a positioning groove, and the positioning device further comprises:

an arm coupling with the second end of the pin, and extending towards the positioning groove, and a positioning block disposed on the arm, wherein the arm pivots on the second end of the pin to engage the positioning block with the positioning groove when in a positioning state.

3. The satellite receiver of claim 2, wherein the arm and the second end of the pin are coupled together to form a cam, and the cam has a first radius part and a second radius part, the arm rotates relatively to the second end of the pin to alternatively drive the first radius part and the second radius part to face the base.

4. The satellite receiver of claim 1, wherein the positioning device includes an arm, coupled with the second end of the pin to pass through the first slot, wherein the arm and the second end of the pin are coupled together to form a cam, the cam includes a first radius part and a second radius part, the arm rotates together with the second end of the pin to alternatively rotate the first radius part and the second radius part to face the base.

5. The satellite receiver of claim 4, wherein the first end of the pin forms a clamp unit to support the base together with the cam.

6. The satellite receiver of claim 4, wherein the positioning device includes a spring washer disposed to loop around the second end of the pin passing through the first slot, the spring washer is disposed between the cam and the base.

7. The satellite receiver of claim 1, wherein the positioning device includes a connection stand coupled with the rotation stand and having a guiding aperture, wherein the connection end of the rod passes through the guiding aperture and couples with the connection stand.

8. The satellite receiver of claim 7, wherein the rod is coupled with the connection stand by engaging with the guiding aperture of the connection stand, and the adjusting end generates horizontal displacement relative to the connection stand by rotating the rod.

9. The satellite receiver of claim 7, wherein the base has a second slot, the connection stand passes through the second slot and is coupled with the rotation stand, and the rotation stand and the rod are disposed on different sides of the base.

10. The satellite receiver of claim 7, wherein the positioning device includes a cover, the cover is connected with a first end of the pin to clamp the adjusting end of the rod.

11. The satellite receiver of claim 10, wherein a tenon is disposed on the first end of the pin, the cover has a rod groove used to accommodate the rod and a mortise perpendicular to the rod groove, the rod has a circular groove; when the rod is rotatably disposed between the pin and the cover, the tenon simultaneously enters the circular groove and the mortise to prevent the rod from generating axial displacement relative to the pin.

12. The satellite receiver of claim 1, wherein the base has a third slot surrounding the axis aperture, the rotation stand includes a guiding rod and a locking device, the guiding rod passes through the third slot, the locking device selectively limits and releases the displacement of the guiding rod relative to the third slot.

13. A satellite receiver, comprising:

a base, comprising a shaft and a first slot;

a rotation stand, comprising an axis aperture, wherein the shaft passes through the axis aperture, the rotation stand is rotatably attached on the base;

an adjusting mechanism including a rod having a connection end and an adjusting end, wherein the connection end of the rod couples with the rotation stand through the base; and a positioning device having a pin, wherein a first end of the pin couples with the adjusting end of the adjusting mechanism, and a second end of the pin passes through the first slot, and the positioning device selectively limits the displacement of the adjusting mechanism relative to the base.

14. The satellite receiver of claim 13, wherein the base is defined a positioning groove, and the positioning device further includes:

an arm coupling with the second end of the pin, and extending towards the positioning groove, and a positioning block disposed on the pulling arm, wherein the arm pivots on the second end of the pin to engage the positioning block with the positioning groove when in a positioning state.

15. The satellite receiver of claim 14, wherein the arm and the second end of the pin are coupled together to form a cam, the cam has a first radius part and a second radius part, the arm rotates relatively to the second end of the pin and alternatively moves the first radius part or the second radius part to face the base.

16. The satellite receiver of claim 13, wherein the positioning device includes an arm coupled with the second end of the pin passing through the first slot, wherein a part where the arm and the second end of the pin are coupled together to form a cam, the cam includes a first radius part and a second radius part, the arm rotates relatively to the second end of the pin and alternatively rotates the first radius part or the second radius part to face the base.

17. The satellite receiver of claim 16, wherein the first end of the pin forms a clamp unit to support the base together with the cam.

18. The satellite receiver of claim 16, wherein the positioning device includes a spring washer disposed to loop around the second end of the pin passing through the first slot, the spring washer is disposed between the cam and the base.

19. The satellite receiver of claim 13, wherein the adjusting mechanism includes a connection stand coupled with the rotation stand, the adjusting mechanism has a guiding aperture, wherein the connection end of the rod passes through the guiding aperture and couples with the connection stand, while the other end of rod forms the adjusting end.

20. The satellite receiver of claim 19, wherein the rod is coupled with the connection stand by engaging with the guiding aperture of connection stand, the adjusting end rotates the rod to generate horizontal displacement relative to the connection stand.

21. The satellite receiver of claim 19, wherein the base has a second slot, the connection stand passes through the second slot and is coupled with the rotation stand, and the rotation stand and the rod are disposed on different sides of the base.

22. The satellite receiver of claim 19, wherein the positioning device includes a cover, the cover is connected with a first end of the pin to clamp the adjusting end of the rod.

23. The satellite receiver of claim 22, wherein a tenon is disposed at the first end of the pin, the cover includes a rod groove to accommodate the rod and also includes a mortise perpendicular to the rod groove, the rod includes a circular groove, when the rod is disposed between the pin and the cover, the tenon enters the circular groove and entering the mortise to prevent the rod from generating axial displacement relative to the pin.

24. The satellite receiver of claim 13, wherein the base includes a third slot surrounding the axis aperture, the rotation stand includes a guiding rod and a locking device, the guiding rod passes through the third slot, the locking device selectively restrains and releases the displacement of the guiding rod relative to the third slot.

* * * * *